(12) United States Patent
Mauchle et al.

(10) Patent No.: US 10,847,966 B2
(45) Date of Patent: Nov. 24, 2020

(54) CONTROL CIRCUIT FOR PROTECTING AGAINST SPARK DISCHARGE

(71) Applicant: GEMA SWITZERLAND GMBH, St. Gallen (CH)

(72) Inventors: Felix Mauchle, Abtwil (CH); Mario Vasella, Sevelen (CH)

(73) Assignee: GEMA SWITZERLAND GMBH, St. Gallen (CH)

(*) Notice: Subject to any disclaimer, the term of this patent is extended or adjusted under 35 U.S.C. 154(b) by 377 days.

(21) Appl. No.: 15/746,801

(22) PCT Filed: Jun. 15, 2016

(86) PCT No.: PCT/EP2016/063785
§ 371 (c)(1),
(2) Date: Jan. 22, 2018

(87) PCT Pub. No.: WO2017/025227
PCT Pub. Date: Feb. 16, 2017

(65) Prior Publication Data
US 2020/0083698 A1    Mar. 12, 2020

(30) Foreign Application Priority Data
Aug. 12, 2015  (DE) .................. 10 2015 215 402

(51) Int. Cl.
*H02H 7/00*     (2006.01)
*B05B 5/053*    (2006.01)
(Continued)

(52) U.S. Cl.
CPC ............. *H02H 7/003* (2013.01); *B05B 5/053* (2013.01); *H02H 1/0007* (2013.01); *H02H 1/043* (2013.01)

(58) Field of Classification Search
None
See application file for complete search history.

(56) References Cited

U.S. PATENT DOCUMENTS

| 4,672,500 A | 6/1987 | Tholome et al. |
| 5,138,513 A | 8/1992 | Weinstein |

(Continued)

FOREIGN PATENT DOCUMENTS

| CH | 532859 | 2/1973 |
| CN | 102355955 A | 2/2012 |

(Continued)

OTHER PUBLICATIONS

First Chinese Office Action dated Nov. 2, 2018, received for corresponding Chinese Application No. 201680047767.7.
(Continued)

*Primary Examiner* — Michael P. Rodriguez
(74) *Attorney, Agent, or Firm* — Kinney & Lange, P.A.

(57) ABSTRACT

The invention relates to a control circuit for protecting an electrostatic spray-coating apparatus, which has a high-voltage supply, against spark discharge. The control circuit has a disconnection device for automatically disconnecting the high-voltage supply, and has a device for detecting abnormal operation of the high-voltage supply. The device for detecting abnormal operation of the high-voltage supply is designed to monitor at least one parameter which is characteristic of the operation of the high-voltage supply, and to output a corresponding disconnection signal to the disconnection device when the at least one parameter which is characteristic of the operation of the high-voltage supply exceeds or falls below a predefined or predefinable limit value.

13 Claims, 2 Drawing Sheets

(51) Int. Cl.
*H02H 1/00* (2006.01)
*H02H 1/04* (2006.01)

(56) References Cited

U.S. PATENT DOCUMENTS

| | | | |
|---|---|---|---|
| 6,437,963 B1* | 8/2002 | Hamilton | B05B 5/10 361/227 |
| 7,617,997 B2 | 11/2009 | Nagai | |
| 2012/0010832 A1* | 1/2012 | Geiger | B05B 5/10 702/60 |

FOREIGN PATENT DOCUMENTS

| | | | | |
|---|---|---|---|---|
| GB | 2115243 A | * | 9/1983 | ............. H02H 7/003 |
| GB | 2115243 A | | 9/1983 | |
| JP | 2003303596 A | | 10/2003 | |
| JP | 2004026805 A | | 1/2004 | |
| JP | 2013212475 A | | 10/2013 | |
| JP | 2015163258 A | | 9/2015 | |
| JP | 2015175394 A | | 10/2015 | |
| WO | 2005009621 A1 | | 2/2005 | |
| WO | 2010105738 A1 | | 9/2010 | |
| WO | 2011102008 A1 | | 6/2013 | |

OTHER PUBLICATIONS

Japanese Office Action dated May 22, 2019, received for corresponding Japanese Application No. 2018-506586.
German Search Report, for German Patent Application No. 1020152154025, dated Jun. 15, 2016, 9 pages.
International Search Report & Written Opinion, for PCT Patent Application No. PCT/EP2016/063785, dated Sep. 14, 2016, 14 pages.
International Preliminary Report on Patentability, for PCT Patent Application No. PCT/EP2016/063785, dated Feb. 13, 2018, 9 pages.

* cited by examiner

CONTROL CIRCUIT FOR PROTECTING AGAINST SPARK DISCHARGE

BACKGROUND

The present invention relates to the field of electrostatic coating. Specifically, the present invention relates to a protective measure for safely using electro-static-based coating techniques. The electrostatic coating process uses high voltage of generally several tens of thousands of volts and simultaneously produces explosive solvent/vapor-air mixtures or dust/air mixtures.

In the electrostatic spraying of liquid paint, the liquid coating material is transformed into a mist of paint droplets and deposited on the object to be coated (workpiece) by the forces of the electrical field. In so doing, the drop-lets are charged by high voltage on the order of magnitude of several tens of kilovolts so they will be attracted to the grounded object (workpiece). The coating material can be sprayed either by means of compressed air, liquid pressure or by a combination of the cited methods and other centrifugal forces.

In the electrostatic powder coating process, an airflow guides the coating material (coating powder) from a powder container to an electrostatic spray-coating apparatus. The powder particles flowing through the spray-coating apparatus are charged by a high voltage of several tens of kilovolts which are generally supplied by a high-voltage supply. The charged powder particles are attracted to the grounded object (workpiece) to be coated and deposit on same.

In electrostatic flocking, short-staple fibers (flock) are conveyed out of a storage container by an electrical field. The flock is aligned in the electrical field and deposits on adhesive-coated grounded surfaces of the object to be coated. The flock particles have a defined conductivity and are charged by the electrostatic flocking apparatus via high voltage of several tens of kilovolts, form dipoles, and gravitate in the form of a cloud to the grounded object (workpiece) or flocked surface respectively as a function of the force of the charges, adhering to the adhesive surfaces.

Since the atomized coating material is charged by high voltage of some tens of thousands of volts in the above-cited electrostatic coating processes, particular attention needs to be paid to preventing the danger of explosion during electrostatic coating. An explosion can in particular occur during electrostatic coating when the concentration of sprayed combustible coating material in the air lies within explosive limits and when there is an ignition source of sufficient energy for the explosive atmosphere. Said ignition source can in particular be an electric arc or a spark.

Particular attention moreover needs to be paid to the electrical hazards of using high voltage of several tens of thousands of volts during electrostatic coating. An electric shock ensuing from direct or indirect contact with for example a charging electrode of the spray-coating apparatus can particularly occur from touching the charging electrode.

SUMMARY

Thus, the present disclosure deals with the task of specifying the most reliable control circuit able to be optimally adapted to the respective application for protecting an electrostatic spray-coating apparatus against spark discharge. The various electrostatic spray-coating apparatus considered herein are in particular apparatus having a high-voltage supply for electrostatically charging the coating material to be sprayed or, respectively, one to which a corresponding high-voltage supply has been allocated for the electrostatic charging of the coating material to be sprayed. The coating material to be sprayed is in particular a liquid coating material (wet paint) or a powdered coating material (coating power). However, it is also conceivable for the present disclosure to be used in spray-coating apparatus which spray short-staple fibers (flock) onto adhesive-coated grounded surfaces of objects to be coated.

A further task of the present disclosure relates to specifying a corresponding electrostatic spray-coating apparatus able to effectively prevent spark discharge during operation. A corresponding method for electrostatically spray coating objects is furthermore to be specified.

Accordingly, in particular specified is a control circuit for protecting an electrostatic spray-coating apparatus having a high-voltage supply from spark discharge, wherein the control circuit comprises a disconnect device for automatically disconnecting the high-voltage supply and a device for detecting abnormal operation of the high-voltage supply. The high-voltage supply in particular relates to an apparatus allocated to the electrostatic spray-coating apparatus which, generally speaking, consists of a low-voltage part, a high-voltage generator, e.g. in the form of a high-voltage cascade, and a charging electrode for electrostatically charging the coating material (liquid or powdered) to be sprayed. A high-voltage cascade in the sense of the present disclosure is an electrostatic circuit which converts supplied alternating voltage into a relatively high direct voltage of up to several tens of thousands of volts. This high voltage is obtained by cascading; i.e. a multiple series connection of Greinacher circuits. The cascade supplies a theoretically virtually unlimited output voltage depending upon the number of diodes and capacitors. In practice, however, a limit is thereby set by the capacitors being connected in series, whereby as the number of capacitors increases, the capacitance continually lessens. As a result, the output voltage eventually collapses even at minimal current drain.

The device used in the control circuit according to the disclosure for detecting an abnormal operation of the high-voltage supply is designed to monitor at least one parameter which is characteristic of the operation of the high-voltage supply—preferably continuously or at predetermined times or upon predetermined events respectively—and to output a corresponding disconnect signal to the disconnect device when the at least one parameter characterizing the operation of the high-voltage supply exceeds or falls below a predefined or definable limit value, thus detecting an abnormal operation of the high-voltage supply.

So doing thereby ensures the preferably immediate disconnection of the high-voltage supply upon abnormal operation so that the electrostatic spray-coating apparatus is effectively protected against spark discharge. Hence, the threat of explosions and/or electrical hazards during the operation of the electrostatic spray-coating apparatus can be effectively eliminated.

Parameters characteristic of the operation of the high-voltage supply are in particular the amount (level) of high-voltage output provided at the output of the high-voltage supply, the amount (level) of operating current fed to the high-voltage supply, and/or the amount (level) of spray current from the charging electrode of the spray-coating apparatus to the object to be coated. It is hereby conceivable to either indirectly or directly detect and/or measure the operating current fed to the high-voltage supply and/or the spray current of the charging electrode to the object to be coated.

Indirect spray current measurement can for example consist of measuring the operating current of the high-voltage supply; i.e. the electric current flowing through a primary coil of a transformer which has a high-voltage cascade connection with rectifiers and capacitors connected to its secondary coil. Alternatively thereto, it is however also conceivable to indirectly determine the spray current and that by measuring the current flowing in the secondary coil between the transformer and a high-voltage cascade connection. The spray current can for example be indirectly measured via the voltage drop across an electrical resistance upstream of the charging electrode.

On the other hand, directly measuring the spray current is however also conceivable in order to in particular enable unadulterated measurement results and quick control circuit reaction to deviations. It is thereby for example conceivable to arrange a spray current measurement circuit in the electrical return path from the object to be coated back to the high-voltage supply or control circuit respectively in order to measure the spray current at that point.

According to one aspect of the present disclosure, a closed loop system is further provided in order to operate the high-voltage supply of the electrical spray-coating apparatus in constant-current operation. The term "constant-current operation" as used herein is to be understood as operation of the high-voltage supply in which the closed loop system directly feeds an actual value of the high-voltage current back to a control unit. The operating current of the high-voltage supply or spray current respectively is thereby kept constant, whereby the high voltage output of the high-voltage supply varies depending on load between a minimum and a maximum value defined in terms of the process.

In this further development of the control circuit, in which a closed loop system is further provided to operate the high-voltage supply in constant-current operation, the device for detecting abnormal operation of the high-voltage supply is designed to detect the high voltage output of the high-voltage supply and output a corresponding disconnect signal to the disconnect device if:

a present given value (level) of the high voltage output of the high-voltage supply falls below a predefined or definable limit value; and/or a present given rate of change of the high voltage output of the high-voltage supply falls below a predefined or definable limit value; and/or an average rate of change of the high voltage output of the high-voltage supply falls below a predefined or definable limit value.

The high voltage output of the high-voltage supply can thereby be detected directly or indirectly. A herein preferential indirect detecting of the high voltage output of the high-voltage supply can for example ensue by measuring the live electrical voltage on the primary or secondary coil of a transformer which has a high-voltage cascade connection with rectifiers and capacitors connected to its secondary coil.

Direct detecting of the high voltage output of the high-voltage supply can ensue by measuring the voltage drop across a resistance at the output of the high-voltage supply.

The term "average rate of change of the high voltage output of the high-voltage supply" as used herein is to be generally understood as the average change in the high voltage output within a period of time which is preferably set manually by the operator of the electrostatic spray-coating apparatus.

The definable time period for determining the average rate of change of the high voltage output of the high-voltage supply is preferably to be selected on an application-specific basis so that the electrostatic spray-coating apparatus, or the control circuit associated with the electrostatic spray-coating apparatus respectively, can thereby be adapted to the specific individual case as optimally as possible.

Alternatively or additionally thereto, a further aspect of the present disclosure provides for an open loop system for operating the high-voltage supply in voltage-controlled operation.

The term "voltage-controlled operation" as used herein is to be understood as operation of the high-voltage supply with no feedback of the high voltage output of the high-voltage supply. In voltage-controlled operation, the high voltage output of the high-voltage supply is usually set at a defined operating current. However, the high voltage output of the high-voltage supply is not kept constant by a control unit, it varies as a function of the operating current and the load response of the high-voltage supply.

In the latter cited aspect of the present disclosure, in which an open loop system is provided to operate the high-voltage supply in voltage-controlled operation, the device for detecting abnormal operation of the high-voltage supply is designed to detect the operating current of the high-voltage supply or the spray current and output a corresponding disconnect signal to the disconnect device if:

a present given value (level) of the operating current of the high-voltage supply or the spray current exceeds a predefined or definable limit value; and/or a present given rate of change of the operating current of the high-voltage supply or the spray current exceeds a predefined or definable limit value; and/or an average rate of change of the operating current of the high-voltage supply or spray current exceeds a predefined or definable limit value.

Alternatively or additionally to the previously cited aspects, a further aspect of the present dislcosure provides for a closed loop system for operating the high-voltage supply in constant-voltage operation.

The term "constant-voltage operation" as used herein is particularly to be understood as operation with direct feedback of the actual high voltage output value. In constant-voltage operation, the set high voltage output of the high-voltage supply is kept constant by a control unit up to the output limit of the high-voltage supply, independently of the variable operating current of the high-voltage supply.

In this embodiment, in which a closed loop system is provided to operate the high-voltage supply in constant-voltage operation, the device for detecting abnormal operation of the high-voltage supply is designed to (indirectly or directly) detect the operating current of the high-voltage supply and output a corresponding disconnect signal to the disconnect device if:

a present given value (level) of the operating current of the high-voltage supply or the spray current exceeds a predefined or definable limit value; and/or a present given rate of change of the operating current of the high-voltage supply or the spray current exceeds a predefined or definable limit value; and/or an average rate of change of the operating current of the high-voltage supply or spray current exceeds a predefined or definable limit value.

The operating current of the high-voltage supply or respectively spray current is for example the current fed to the input of the high-voltage supply; i.e. for example the electric current flowing though a primary coil of a transformer which has a high-voltage cascade connection of the high-voltage supply connected to its secondary coil.

Alternatively thereto, the operating current of the high-voltage supply, or spray current respectively, can also be measured indirectly, and that for example by measuring a current flowing in the secondary coil between the transformer and a high-voltage cascade connection of the high-voltage supply.

Alternatively, however, a direct measuring of the spray current is also conceivable, as is herein preferential.

In the last two specified embodiments of the control circuit, the average rate of change of the operating current of the high-voltage supply corresponds to the average rate of change of the operating current within a period of time as preferably set manually by the operator of the electrostatic spray-coating apparatus. This allows the sensitivity and the response behavior of the control circuit to be adjusted to the specific individual case.

What all of the aforementioned embodiments have in common is effectively preventing dangerous discharges between live high voltage and grounded parts during the operation of the electrostatic spray-coating apparatus, in particular between the charging electrode of the spray-coating apparatus and the grounded object (to be coated). This is achieved by the high-voltage supply being automatically disconnected, in consequence of which the charging electrode of the electrostatic spray-coating apparatus is discharged.

Doing so can particularly effectively prevent flashover during the normal operation of the electrostatic spray-coating apparatus since the disconnect device of the control circuit automatically disconnects the high-voltage supply when the distance between the charging electrode of the spray-coating apparatus and the object to be coated is too small.

According to a further aspect of the present disclosure, the control circuit is further provided with a transient protection device in order to protect the high-voltage supply from unwanted automatic disconnecting by the disconnect device of the control circuit. This is particularly advantageous upon activation of the high-voltage supply or when modifying the operating point of the high-voltage supply since in such cases, the parameters characterizing the operation of the high-voltage supply can easily overshoot; i.e. exceed or fall below the critical limit value. Providing a corresponding transient protection device effectively suppresses such unwanted automatic disconnecting of the high-voltage supply by the disconnect device.

Conceivable in this context is, for example, the transient protection device to be designed to deactivate the disconnect device of the control circuit for a predefined or definable period of time when the high-voltage supply is activated or upon the high-voltage supply operating point being modified. Depending on the set operating point of the high-voltage supply and/or depending on the application of the electrostatic spray-coating apparatus, this predefined or definable period of time preferably amounts to 0.25 to 4 seconds and even more preferentially, 1 to 2 seconds.

Of course, however, other time periods are also conceivable, particularly periods able to be manually set by the operator of the electrostatic spray-coating apparatus.

Alternatively or additionally thereto, it is conceivable for the transient protection device to be designed to vary the output limit value of a disconnect signal to the disconnect device after the high-voltage supply being activated or upon modification of the high-voltage supply, and that from an initially relatively insensitive value to the predefined or definable value of the limit value. This likewise enables effectively preventing the disconnect device from unwantedly disconnecting the high-voltage supply upon its activation or upon modification of the operating point of the high-voltage supply.

Alternatively or additionally thereto, it is further conceivable for the transient protection device to be designed to only allow the disconnect device to automatically disconnect the high-voltage supply when the at least one parameter characteristic of the high-voltage supply operation exceeds/falls below the predefined or definable limit value for a predefined period of time. This measure likewise effectively suppresses the overshooting of the parameter characteristic of the high-voltage supply operation particularly when the high-voltage supply is activated or the high-voltage supply operating point is modified.

The present disclosure is not limited solely to a control circuit of the above-described type but also relates according to a further aspect to a spray-coating apparatus for electrostatically spray coating objects with coating material, in particular coating powder or wet paint, wherein the spray-coating apparatus has a high-voltage supply as well as a control circuit of the disclosed type. The high-voltage supply can thereby advantageously be operated either in constant-current operation, constant-voltage operation or voltage-controlled operation.

The present disclosure further relates, according to a further aspect, to a method for electrostatically spray coating objects in which coating material (liquid or powdered) is electrostatically charged by means of a charging electrode connected to a high-voltage supply and atomized toward an object to be coated, wherein the operation of the high-voltage supply in this method is checked preferably continuously or at predetermined times or upon predetermined events respectively, and wherein the high-voltage supply is automatically disconnected upon an abnormal operation of the high-voltage supply. To detect abnormal operation of the high-voltage supply in this method, at least one parameter which is characteristic of the operation of the high-voltage supply is monitored and a corresponding disconnect signal output to a disconnect device when the at least one parameter characterizing the high-voltage supply operation exceeds or falls below a predefined or definable limit value.

BRIEF DESCRIPTION OF THE DRAWINGS

The following will make reference to the drawings in describing the invention on the basis of a preferential example embodiment. The figures show.

DETAILED DESCRIPTION

Figure 1:
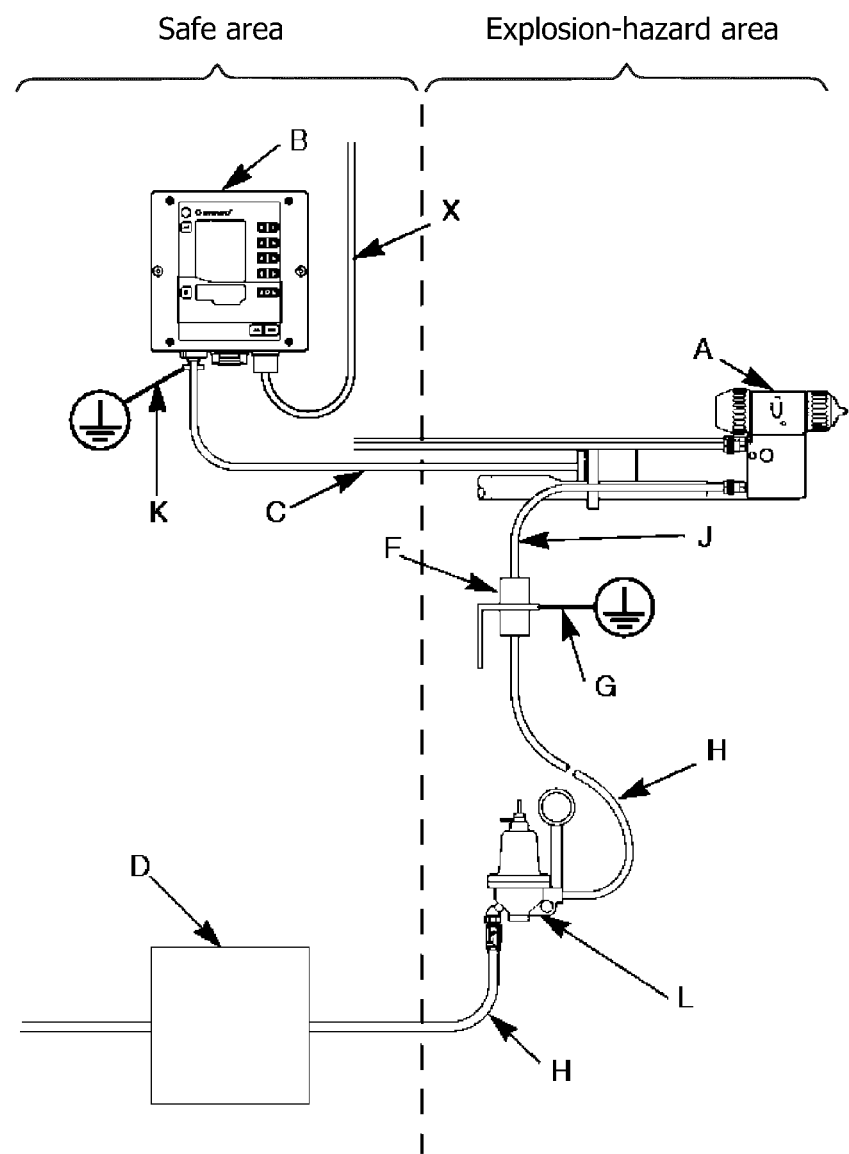
FIG. 1 a schematic view of an example embodiment of an electrostatic spray-coating apparatus.

The spray-coating apparatus shown schematically in FIG. 1 comprises a manual or automatic spray gun for spray coating material in the form of liquid or preferably powder onto an object to be coated (not depicted in FIG. 1). It is thereby to be assumed that the object to be coated consists of an electrically conductive material and is connected to ground potential. In automatic spray-coating apparatus, objects to be coated can be transported past the spray gun by a not-shown conveyor device so as to enter into the stream of spray from the spray gun.

The spray gun is provided with at least one charging electrode (high-voltage electrode) for electrostatically charging the coating material to be sprayed. A high voltage generator feeds DC high voltage to said charging electrode in a range of between 1 kV and 150 kV, preferably a value between the two.

The high voltage generator can comprise a transformer for stepping up a low alternating voltage into a higher alternating voltage in the usual manner and a cascade circuit having a plurality of rectifiers and capacitors in usual manner and which converts the alternating voltage into DC high voltage.

The low alternating voltage is produced by an oscillator as a function of a control voltage which is a control variable for the high voltage of the charging electrode. The oscillator can be a part of the high voltage generator and as such integrated into the spray gun or else can also be integrated into a control device which, as a whole, forms a control unit.

The control unit contains an operating parameter memory in which a variably adjustable at least one high voltage limiting value and at least one spray current limiting value for the respective maximum high voltage electrode value possible can be input by means of data transfer from a data input station, for example a higher-level computer, or manually, e.g. via keyboard, and be stored therein. A plurality of such values for different operating situations, in particular different objects to be coated and different spray coating materials, can preferably be stored. In another embodiment, the stored values cannot be variable fixed values.

The high voltage limiting value from the operating parameter memory is input into a high-voltage limiting circuit. The spray current limiting value from the operating parameter memory is input into a spray current controller.

The spray current of the charging electrode closing to ground from an object to be coated is measured by a spray current measuring circuit on the grounded side of the object to be coated and is likewise input into the spray current controller as the actual spray current value. The spray current controller compares the actual spray current value to the spray current limiting value and generates a high-voltage controller variable as a function thereof which the spray current controller passes to the high-voltage limiting circuit. The spray current controller is preferably a PI (proportional integral) controller.

The high-voltage limiting circuit generates the control voltage as a function of the high voltage limiting value and the high-voltage controller variable, said voltage being fed to the oscillator in the form of direct current input voltage and being the control variable for the high voltage of the charging electrode. The high-voltage limiting circuit ensures that in the case where the high-voltage controller variable is greater than or equal to the high voltage limiting value, the direct voltage value of the control voltage is equal to the high voltage limiting value. The high-voltage limiting circuit further ensures that in all cases of the high-voltage controller variable being lower than the high voltage limiting value, the control voltage is equal to the high-voltage controller variable.

Figure 2:
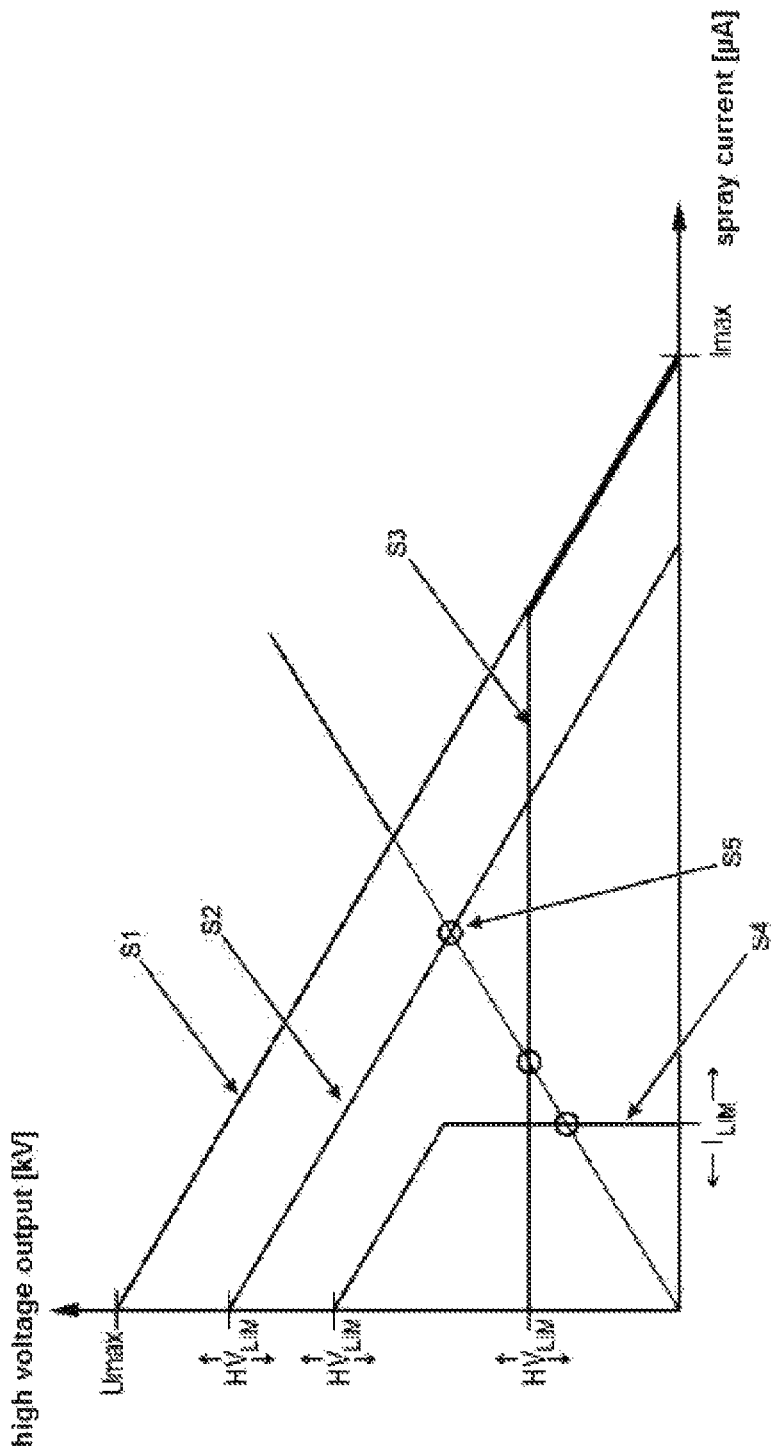
FIG. 2 a high voltage/spray current diagram of the spray-coating apparatus according to FIG. 1.

FIG. 2 shows the spray current on the horizontal axis (measured in microampere) and the corresponding high voltage on the vertical axis (measured in kV). The uppermost characteristic is a standard characteristic. It shows the spray current of the charging electrode rising while the high voltage falls as the distance between the charging electrode and an object to be coated decreases in known mechanisms. The high voltage has its maximum value at the greatest possible distance or respectively infinite distance of the object to be coated or another electrically conductive object from the charging electrode.

The middle characteristic in FIG. 2 relates to an embodiment in which the maximum DC high voltage of the high-voltage electrode is limited to a maximum value although there was no limiting of the current.

The lowermost characteristic in FIG. 2 shows the above-described circuit in which both the spray current as well as the high voltage are respectively limited to a maximum value.

The spray-coating apparatus as schematically depicted for example in FIG. 1 is in particular provided with a control circuit (which can be provided here for example in the form of control device software). The control circuit enables the high-voltage supply associated with the spray gun to be automatically disconnected when the control circuit detects an abnormal operation.

To detect an abnormal operation, the control circuit can monitor the relationship between the spray current and the high voltage at the charging electrode. This ratio directly reflects the distance between the charging electrode to a grounded object. The control circuit automatically disconnects the high-voltage supply by means of a disconnect device as soon as the spray current/high voltage ratio falls below a predefined or definable limit value.

Alternatively thereto, the rate of change of the spray current/voltage ratio over time can be monitored. If a grounded object approaches the charging electrode of the spray-coating apparatus at high speed, the control circuit automatically disconnects the high-voltage supply. This dynamic operation is preferential as it minimizes the risk of unwanted automatic disconnection.

The respective limit values for emulating a disconnect signal can preferably be manually adapted by the operator of the spray-coating apparatus and to the respective circumstances and applications. However it would also be conceivable in this context for said limit values to be transferred to the control device via a bus system, in particular a field bus system.

A transient protection device preferably realized in the form of software is further provided in the example of the spray-coating apparatus as depicted in FIG. 1 in order to prevent an unwanted automatic disconnecting of the high-voltage supply particularly when the high-voltage supply is activated or the operating point of the high-voltage supply modified. Because the fact that the parameter which is characteristic of the operation of the high-voltage supply tends to overshoot especially upon activation cannot be eliminated, there is the risk of exceeding or falling below the limit value which triggers the automatic disconnecting of the high-voltage supply. It is conceivable in this context for the transient protection device to be designed to deactivate the automatic disconnection of the high-voltage supply for a predefined or definable period of time of in particular 1 to 2 seconds upon the high-voltage supply being activated or the operating point of the high-voltage supply modified.

Alternatively or additionally thereto, it is conceivable for the limit values initiating the automatic disconnection of the high-voltage supply to only gradually assume the predefined or definable value upon activation or upon modification of the operating point of the high-voltage supply, and that starting from an initially relatively insensitive value.

The invention is not limited to the example embodiment described with reference to the drawings but rather yields from an integrated consideration of all the features disclosed herein in context.

LIST OF REFERENCE NUMERALS

A spray gun
B control device with control circuit

C current supply gun
D fluid source
F fluid hose mount
G ground wire
H fluid hose
J fluid feed to gun
K ground wire
L fluid controller
X current supply control device
S1 open loop system at maximum high voltage output of the high-voltage supply
S2 open loop system at 80% maximum high voltage output of the high-voltage supply
S3 closed loop system and high-voltage supply in constant-voltage operation
S4 closed loop system and high-voltage supply in constant-current operation
S5 operating point

The invention claimed is:

1. A control circuit for protecting an electrostatic spray-coating apparatus having a high-voltage supply from spark discharge, wherein the control circuit comprises a disconnect device for automatically disconnecting the high-voltage supply and a device for detecting an abnormal operation of the high-voltage supply, wherein the device for detecting an abnormal operation of the high-voltage supply is designed to monitor at least one parameter which is characteristic of the operation of the high-voltage supply and to output a corresponding disconnect signal to the disconnect device when the at least one parameter characterizing the operation of the high-voltage supply exceeds or falls below a defined limit value; and
wherein a closed loop system is further provided in order to operate the high-voltage supply in constant-current operation, wherein in the constant-current operation an operating current of the high-voltage supply or a spray current is kept constant and a high-voltage output of the high-voltage supply varies depending on load between a defined minimum and maximum value, and wherein the device for detecting abnormal operation of the high-voltage supply is designed to detect the high voltage output of the high-voltage supply and output a corresponding disconnect signal to the disconnect device if:
a present value of the high voltage output of the high-voltage supply falls below a defined limit value; and/or
a rate of change of the high voltage output of the high-voltage supply falls below a defined limit value.

2. The control circuit according to claim 1,
wherein the rate of change of the high voltage output of the high-voltage supply is defined as an average change in the high voltage output within a definable period of time.

3. The control circuit according to claim 1,
wherein an open loop system is further provided in order to operate the high-voltage supply in voltage-controlled operation, and wherein the device for detecting abnormal operation of the high-voltage supply is designed to detect an operating current of the high-voltage supply or a spray current and output a corresponding disconnect signal to the disconnect device if:
a present value of the operating current of the high-voltage supply or the spray current exceeds a predefined or definable limit value; and/or
a rate of change of the operating current of the high-voltage supply or spray current exceeds a defined limit value.

4. The control circuit according to claim 1,
wherein the device for detecting abnormal operation of the high-voltage supply is further designed to detect an operating current of the high-voltage supply or a spray current and output a corresponding disconnect signal to the disconnect device if:
a present value of the operating current of the high-voltage supply or the spray current exceeds a defined limit value; and/or
a rate of change of the operating current of the high-voltage supply or spray current exceeds a defined limit value.

5. The control circuit according to claim 3,
wherein the rate of change of the operating current of the high-voltage supply or spray current is the average change in the operating current within a definable period of time.

6. The control circuit according to claim 1,
wherein a transient protection device is further provided to protect the high-voltage supply from an unwanted automatic disconnecting by the control circuit, upon activation of the high-voltage supply or upon modification of an operating point of the high-voltage supply.

7. The control circuit according to claim 6,
wherein the transient protection device is designed to deactivate the disconnect device for a defined period of time when the high-voltage supply is activated or the high-voltage supply operating point is modified.

8. The control circuit according to claim 7,
wherein the defined period of time is selected as a function of the operating point of the high-voltage supply and is between 0.25 to 4 seconds.

9. The control circuit according to claim 6,
wherein the transient protection device is designed to vary the limit value of the at least one parameter above or below which a disconnect signal is output to the disconnect device after the high-voltage supply being activated or upon modification of the operating point of the high-voltage supply.

10. The control circuit according to claim 6,
wherein the transient protection device is designed to only allow the disconnect device to automatically disconnect the high-voltage supply when the at least one parameter characteristic of the high-voltage supply operation exceeds or respectively falls below the defined limit value for a defined period of time.

11. A spray-coating apparatus for electrostatically spray coating objects with coating material, wherein the spray-coating apparatus comprises:
a high-voltage supply; and
a control circuit in accordance with claim 1.

12. The spray-coating apparatus according to claim 11,
wherein the high-voltage supply is operable in either constant-current operation, constant-voltage operation or voltage-controlled operation.

13. A method for electrostatically spray coating objects in which a coating material is electrostatically charged by a charging electrode connected to a high-voltage supply and atomized toward an object to be coated, wherein at least one parameter which is characteristic of operation of the high-voltage supply is monitored and a disconnect signal is output to a disconnect device when the at least one parameter characteristic of the high-voltage supply operation exceeds or falls below a defined limit value, wherein the disconnect device then automatically disconnects the high-voltage supply, wherein the high-voltage supply is operated in constant-current operation, wherein in the constant-current operation an operating current of the high-voltage supply or a spray current is kept constant and a high-voltage output of the high-voltage supply varies depending on load between a defined minimum and maximum value, and wherein the high-voltage output of the high-voltage supply is detected and a corresponding disconnect signal output to the disconnect device when:

a present value of the high-voltage output of the high-voltage supply falls below a defined limit value; and/or a rate of change of the high-voltage output of the high-voltage supply falls below a defined limit value.

\* \* \* \* \*